(12) United States Patent
Yamaguchi (10) Patent No.: US 8,358,099 B2
(45) Date of Patent: Jan. 22, 2013

(54) MODULAR ELECTRIC POWER SYSTEM WITH A RENEWABLE ENERGY POWER GENERATING APPARATUS

(75) Inventor: Masao Yamaguchi, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 134 days.

(21) Appl. No.: 13/020,242

(22) Filed: Feb. 3, 2011

(65) Prior Publication Data

US 2011/0194277 A1 Aug. 11, 2011

(30) Foreign Application Priority Data

Feb. 8, 2010 (JP) ................................. 2010-025985

(51) Int. Cl.
*H01M 10/44* (2006.01)
*H02J 7/04* (2006.01)
(52) U.S. Cl. ..................... 320/101; 320/140; 320/162
(58) Field of Classification Search .................... 320/101
See application file for complete search history.

(56) References Cited

U.S. PATENT DOCUMENTS

| 6,448,489 | B2 * | 9/2002 | Kimura et al. | 136/244 |
| 8,096,673 | B2 * | 1/2012 | Kuo | 362/183 |
| 2007/0188130 | A1 | 8/2007 | Scheucher | |

FOREIGN PATENT DOCUMENTS

| EP | 1 986 306 | 10/2008 |
| JP | 2007-26962 | 2/2007 |
| KR | 2009 0081894 | 7/2009 |

OTHER PUBLICATIONS

Extended European Search Report (in English language) issued Nov. 8, 2012 in corresponding European patent application No. 11 00 0819.

* cited by examiner

*Primary Examiner* — Edward Tso
*Assistant Examiner* — Johali Torres Ruiz
(74) *Attorney, Agent, or Firm* — Wenderoth, Lind & Ponack, LLP (57) ABSTRACT

The electric power system is provided with a main module 10 having a switching device 17, and a sub-module 20. The output-side of the sub-module 20 sub-reverse current protection diode 24 is connected to a connection point CP between the main module 10 main reverse current protection diode 14 and the switching device 17 to allow power to be supplied to the load from the sub-battery pack 21 through the sub-reverse current protection diode 24 and the switching device 17. The main module 10 main control circuit 13 controls the switching device 17 ON and OFF to supply power from both the main module 10 main battery pack 11 and the sub-module 20 sub-battery pack 21 to light an illumination source 3.

9 Claims, 7 Drawing Sheets

MODULAR ELECTRIC POWER SYSTEM WITH A RENEWABLE ENERGY POWER GENERATING APPARATUS

BACKGROUND OF THE INVENTION

1. Field of the Invention

The present invention relates to an electric power system that stores power generated from renewable energy in rechargeable batteries, and at night powers a source of illumination with the rechargeable batteries.

2. Description of the Related Art

A streetlight has been developed that charges rechargeable batteries via renewable energy and lights an illumination source with the charged batteries at night.

Refer to Japanese Laid-Open Patent Publication 2007-26962.

SUMMARY OF THE INVENTION

JP 2007-26962 A cites a streetlight with rechargeable batteries that are charged by photovoltaic device (solar cell) output during the day to light an illumination source with the charged rechargeable batteries at night.

Since the streetlight generates electricity with solar cells to light an illumination source at night, it has the characteristic that it can light the illumination source at night by using renewable energy in an effective manner. However, the power generated from renewable energy sources such as the power generated by solar cells varies depending on the natural environment. As a result, this streetlight has drawbacks such as the possibility that the illumination source may not light sufficiently at a given installation site. For example, solar cells generate relatively little power during the often cloudy winter on the side of Japan facing the Sea of Japan. Consequently a solar cell charged rechargeable battery powered streetlight installed on the Sea of Japan side of Japan has the shortcoming that that it may not be possible to light the illumination source with the intended brightness for the prescribed time period. This drawback can be resolved by using a large array of solar cells. However, on the Pacific Ocean side of Japan, clear skies are common even in the winter and large solar cell arrays are unnecessary. In addition, the optimal brightness for the illumination source depends on the streetlight installation site.

The prior art streetlight charges rechargeable batteries with solar cells and powers an illumination source with the rechargeable batteries. To brightly light the illumination source, a large array of solar cells and high capacity rechargeable batteries are required. Accordingly, the size of the solar cell array and the capacity of the rechargeable batteries must be changed to adapt to the installation site and the environment in which the streetlight is used. Consequently, the prior art streetlight has the drawback that manufacturing cost is high.

The present invention was developed considering these types of prior art problems. Thus, it is a primary object of the present invention to provide a modular electric power system that can be simply and easily changed to optimize its use for the installation site and environment and enable inexpensive manufacture in quantity.

To achieve the object described above, the first electric power system of the present invention is provided with a main module 10 and a sub-module 20. The main module 10 has a load, a main renewable energy power generating apparatus that generates electric power from renewable energy, a main battery pack 11 connected to the main renewable energy power generating apparatus with a plurality of rechargeable batteries connected in series and/or parallel that are charged by power generated by the main renewable energy power generating apparatus, a switching device 17 connected between the main battery pack 11 and the load to supply power from the main battery pack 11 to the load, a main control circuit 13 that controls load illumination by controlling the switching device 17 ON and OFF, and a main reverse current protection diode 14 connected in series with the switching device 17 at the output-side of the main battery pack 11 to allow main battery pack 11 discharge to the load while preventing current flow from the load-side back to the main battery pack 11. The sub-module has a sub-battery pack 21 connected in parallel with main battery pack 11 of the main module 10 with a plurality of rechargeable batteries connected in series and/or parallel, a sub-renewable energy power generating apparatus that charges the sub-battery pack 21, and a sub-reverse current protection diode 24 connected in series with the switching device 17 at the output-side of the sub-battery pack 21 to allow sub-battery pack 21 discharge to the load while preventing current flow from the load-side back to the sub-battery pack 21. The output-side of the sub-reverse current protection diode 24 is connected to a connection point CP between the main module 10 main reverse current protection diode 14 and the switching device 17 to allow power to be supplied to the load from the sub-battery pack 21 through the sub-reverse current protection diode 24 and the switching device 17. The main module 10 main control circuit 13 controls the switching device 17 ON and OFF to allow power to be supplied from both the main module 10 main battery pack 11 and the sub-module 20 sub-battery pack 21. Accordingly, sub-modules with renewable energy power generating apparatus and battery packs of the same type as the main module renewable energy power generating apparatus and battery pack can be connected to the main module to power the same load (for example, an illumination source). Consequently, the system has the positive feature that stable power can be supplied by increasing the number of modules.

In the second electric power system of the present invention, the main module 10 can have a main charging switch 15 connected between the output-side of the main renewable energy power generating apparatus and the main battery pack 11 that controls charging of the main battery pack 11, and a main discharging switch 16 connected between the output-side of the main battery pack 11 and the switching device 17 that controls discharging of the main battery pack 11. Similarly, the sub-module 20 can have a sub-charging switch 25 connected between the output-side of the sub-renewable energy power generating apparatus and the sub-battery pack 21 that controls charging of the sub-battery pack 21, and a sub-discharging switch 26 connected between the output-side of the sub-battery pack 21 and the switching device 17 that controls discharging of the sub-battery pack 21. Accordingly, each module is provided with a charging switch and a discharging switch, and battery pack charging and discharging can be independently controlled for each module. Consequently, the system has the positive feature that an appropriate amount of power can be extracted from each module to power the load.

The third electric power system of the present invention can be provided with an alternating current (AC) adapter module 30. The AC adapter module 30 has an AC adapter 31 that converts and supplies power from a commercial power source, and an AC adapter reverse current protection diode 32 connected to the output-side of the AC adapter 31 to allow current flow from the AC adapter 31 to the output while preventing current flow from the output back to the AC adapter 31. The AC adapter module 30 AC adapter output OA node can be connected to the connection point CP. By adding an AC adapter module to the system, the load can be powered in a stable manner even during lengthy periods of cloudy weather with little power generation by supplying power from a commercial power source. This raises reliability to another level and has the positive feature that the system can support maximum renewable energy utilization by employing a configuration that does not normally power the load from the commercial power source.

In the fourth electric power system of the present invention, the main control circuit 13 can monitor the voltage at the connection point CP and control the ON and OFF duty cycle (ratio of the ON time to the total ON and OFF period) of the switching device 17 according to the monitored voltage. Further, the main control circuit 13 can supply power to the load with a higher duty cycle when the monitored voltage is low than when it is high. By monitoring the voltage at the connection point CP, the main control circuit can ascertain the total power supplied by the main module and sub-modules to appropriately control the state of load activation. For example, when an illumination source is used as the load, constant illumination is possible independent of highs and lows in the monitored voltage by pulse width modulation (PWM) control of the duty cycle.

In the fifth electric power system of the present invention, power can be supplied to the load from the main battery pack 11 and the sub-battery packs 21 without intervention of a direct current/direct current (DC/DC) converter by controlling the ON and OFF duty cycle of the switching device 17. Accordingly the system has the positive feature that there is no power conversion loss due to a DC/DC converter and renewable energy can be used in a highly efficient manner.

In the sixth electric power system of the present invention, either solar cells, wind turbines, or tidal power generators can be used as the renewable energy power generating apparatus. Consequently, a stand-alone electric power system can be realized that effectively utilizes renewable energy in accordance with the application and the installation site.

In the seventh electric power system of the present invention, lithium ion batteries can be used as the rechargeable batteries. Consequently, high power per volume can be achieved for a compact, high efficiency source of electric power.

In the eighth electric power system of the present invention, the load can be an illumination source.

In the ninth electric power system of the present invention, light emitting diodes (LEDs) can be used as the illumination source. Consequently, a low power consumption, extremely long lifetime electric power system can be constructed. The above and further objects of the present invention as well as the features thereof will become more apparent from the following detailed description to be made in conjunction with the accompanying drawings.

DETAILED DESCRIPTION OF THE EMBODIMENTS

Figure 1:
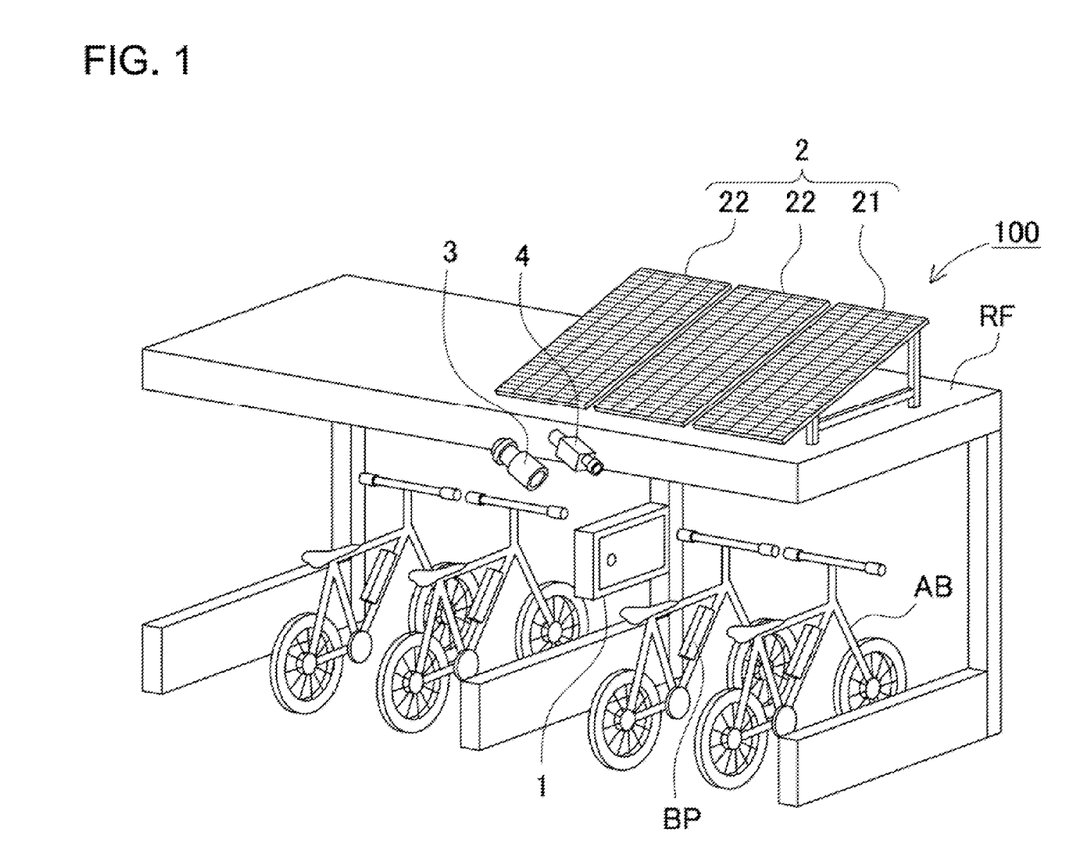
FIG. 1 is a schematic diagram showing an electric power system for the first embodiment of the present invention.
Figure 2:
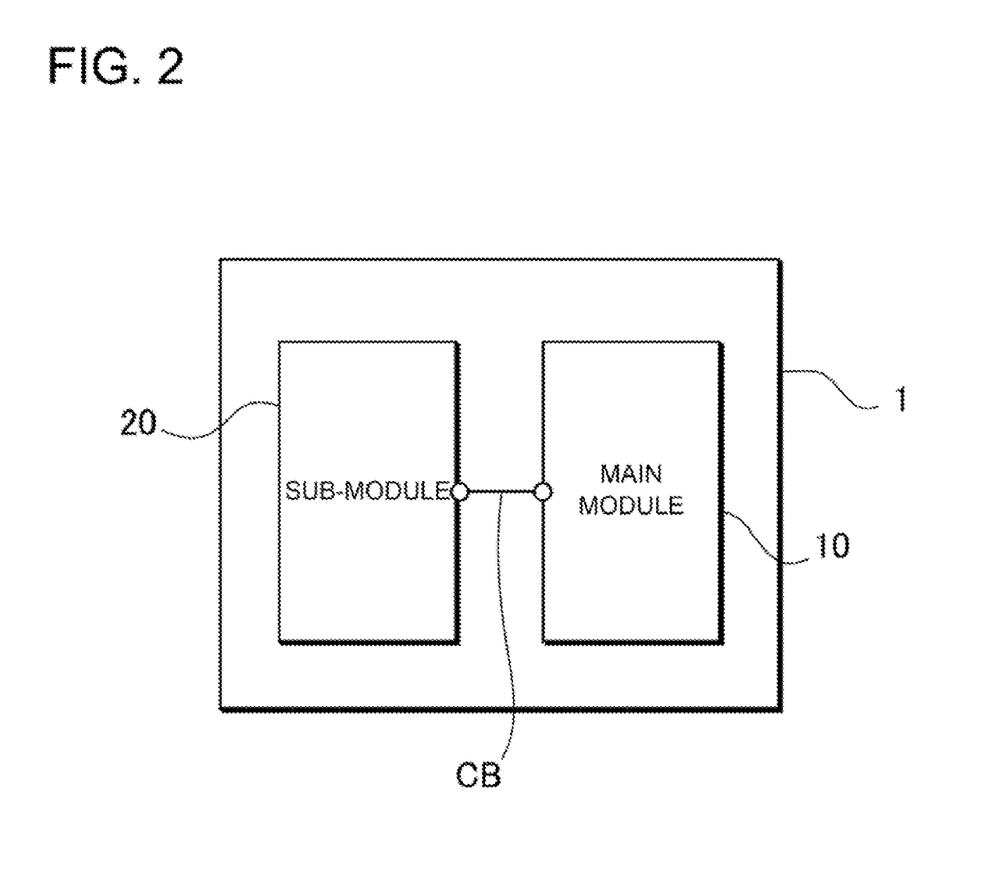
FIG. 2 is a block diagram showing the interior of the console.
Figure 3:
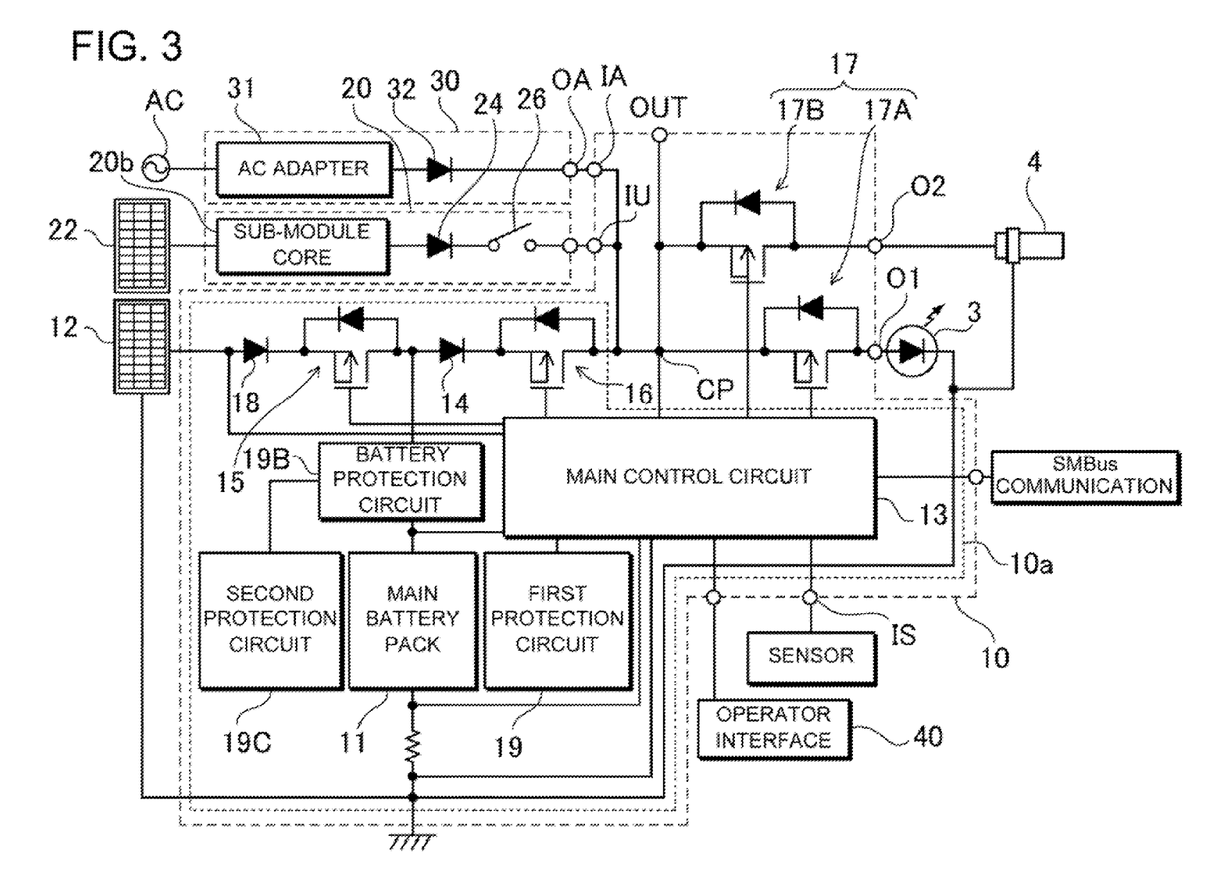
FIG. 3 is a block diagram showing the electric power system.
Figure 4:
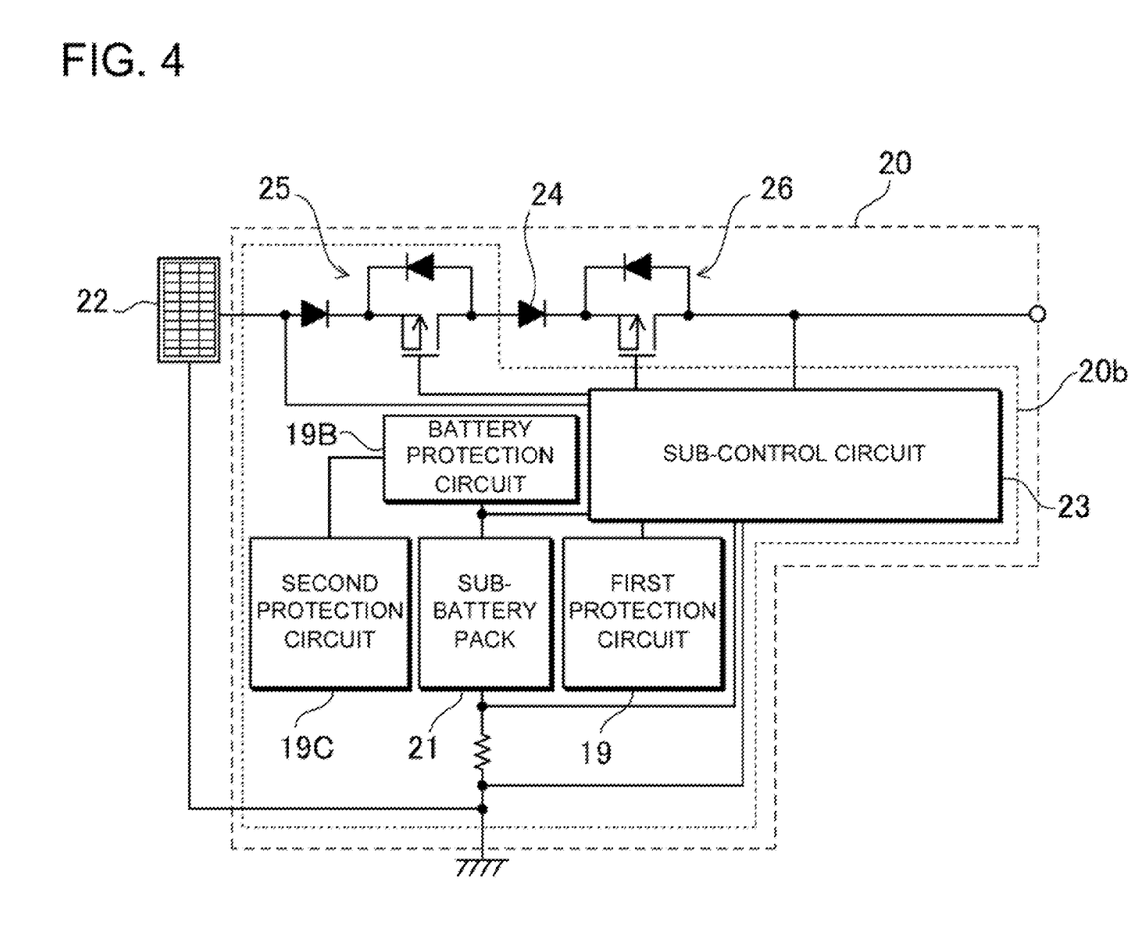
FIG. 4 is a block diagram showing a sub-module.

The following describes embodiments of the present invention based on the figures.
(First Embodiment)
FIGS. 1-4 show an electric power system 100 for the first embodiment of the present invention. FIG. 1 is a schematic diagram depicting an example of the electric power system 100 applied in a bicycle parking and battery charging structure (for example, for bicycles with electric assist), FIG. 2 is a block diagram showing the interior of the console, FIG. 3 is a block diagram of the electric power system 100, and FIG. 4 is a block diagram of a sub-module 20. These figures show examples of an electric power system 100 that uses solar cell panels as the renewable energy power generating apparatus and a streetlight illumination source 3 as the load.

The electric power system 100 of FIG. 1 is provided with solar cell panels 2 installed on the roof RF of the bicycle parking structure, a module box 1 installed beneath the roof RF at a height that can be reached by the user, and an illumination source 3 used as a streetlight. As shown in the block diagram of FIG. 2, a main module 10 and sub-module 20 are house in the module box 1. The main module 10 and the sub-module 20 are connected together via a cable CB and connectors. In addition, the main module 10 and sub-module 20 each house a battery pack and individually connect to solar cell panels.

As shown in the block diagram of FIG. 3, the main module 10 houses a main battery pack 11 and that main battery pack 11 can be charged by energy generated from a main solar cell panel 12, which is the main renewable energy power generating apparatus. Similarly, the sub-module 20 houses a sub-battery pack 21 and that sub-battery pack 21 can be charged by energy generated from a sub-solar cell panel 22, which is the sub-renewable energy power generating apparatus.
(Main Module 10)

The main module 10 of FIG. 3 is provided with a main battery pack 11, a main control circuit 13, a switching device 17, a main reverse current protection diode 14, a main charging switch 15, and a main discharging switch 16. The main module 10 has the series-connection of the main reverse current protection diode 14 and the switching device 17 connected between the main battery pack 11 and the illumination source 3. Main battery pack 11 power is output to the illumination source 3 through the main reverse current protection diode 14 and the switching device 17, and the switching device 17 is controlled ON and OFF by the main control circuit 13. The main control circuit 13 is made up of a microcontroller such as a central processing unit (CPU) or an application specific integrated circuit (ASIC). The main reverse current protection diode 14 is connected in series with the switching device 17 at the output-side of the main battery pack 11 to allow main battery pack 11 discharge to the illumination source 3 while preventing current flow from the illumination source 3 back to the main battery pack 11.
(Switching Device 17)

The switching device 17 is connected to the load output of the main module 10. A plurality of load outputs can be provided. Although the example of FIG. 3 has a plurality of switching devices 17, the system is not limited to that configuration and a single switching device can also be implemented. In the example of FIG. 3, the main module 10 is provided with load output O1 and load output O2 as outputs to connect the loads and extract power. In this example, the illumination source 3 is connected to load output O1, and a wireless transmitting video camera (wireless video camera) 4 is connected to load output O2. A switching device is provided at each load output, and in the example of FIG. 3, switching device 17A is connected to load output O1 and switching device 17B is connected to load output O2. Field effect transistors (FETs) can be used as the switching devices. As a result, the load outputs can be controlled ON and OFF allowing easy implementation of pulse driven output. The main control circuit 13 separately controls switching device 17A for load output O1 and switching device 17B for load output O2. When an illumination source such as an LED illumination source is connected, it is independently controlled by the main control circuit 13 through the switching device 17A at load output O1. As a result, outputs can be controlled separately for each load to control parameters such as individual lighting patterns, or to control a timer to turn OFF the output after a given time has elapsed. As described later, the sensor power output OUT in the example of FIG. 3 is not provided with a switching device.

To interface with externally connected devices, the main module 10 is provided with an input section in addition to the output section. In the example of FIG. 3, a sub-module input IU is provided to connect the sub-module 20.

Further, the main charging switch 15 is connected between the output-side of the main solar cell panel 12 and the main battery pack 11, and charging of the main battery pack 11 is controlled by the main control circuit 13. By employing ON and OFF switching of the main charging switch 15 for pulse-controlled charging, a DC/DC converter is not required for voltage conversion allowing increased efficiency and simplified circuitry.

The main discharging switch 16 is connected between the output-side of the main battery pack 11 and the switching device 17. When main battery pack 11 voltage drops to a set voltage that indicates over-discharging (for example, 3.1V per cell), the micro-controller main control circuit 13 controls the main discharging switch 16 OFF to stop discharge of the main battery pack 11. ON and OFF control of the main charging switch 15 and the main discharging switch 16 is performed by the main control circuit 13. Specifically, during periods when main solar cell panel 12 voltage is high and main battery pack 11 charging is possible, the main charging switch 15 is switched ON and OFF while monitoring main battery pack 11 voltage to charge the main battery pack 11 with the main solar cell panel 12. In contrast, when powering the load such as the illumination source 3, the main discharging switch 16 is switched ON and OFF while preventing over-discharging of the main battery pack 11 to supply power to drive the load and light the illumination source 3. In this example, when main solar cell panel 12 voltage is high, namely when power generation is high, daylight conditions are assumed and the system is put in a main battery pack 11 charging mode. At sunset when main solar cell panel 12 voltage drops, sunset is assumed and the system is switched to a main battery pack 11 discharging mode to drive the load and light the illumination source 3. Consequently, the solar cell panel can be used as a sensor, and a special-purpose daylight sensor to detect daylight and sunset is unnecessary.

The main control circuit 13 performs standard knowledge control functions such as the following. The main control circuit 13 detects battery voltage to control operations such as suspending charging to prevent over-charging and suspending discharging to prevent over-discharging. The main control circuit 13 measures battery temperature via a temperature sensor (not illustrated) and performs protective functions such as halting charging and discharging when the temperature rises abnormally. Further, the main control circuit 13 measures battery current from the voltage drop generated across a current detection resistor and halts charging and discharging when excessive current flows.

Here, the main module 10 circuit shown in FIG. 3 is one example, and the circuit architecture can be changed as appropriate. For example, a diode 18 to prevent reverse current flow during charging is connected at the positive-side of the main battery pack 11 between the main solar cell panel 12 and the main charging switch 15. In addition, a resistor to suppress reverse leakage can be connected in parallel with the main solar cell panel 12. In FIG. 3, the drain-side of the FET main charging switch 15 is connected to the main reverse current protection diode 14 and the main discharging switch 16 in that order, and the output-side (the drain-side of the FET in FIG. 3) of the main discharging switch 16 becomes the connection point CP. However, connection of the main reverse current protection diode and the main discharging switch can be reversed. Further, the main module 10 can be provided with protection circuitry as required. In the example of FIG. 3, a first protection circuit 19 is connected to the main control circuit 13, a battery protection circuit 19B is connected to the positive-side of the main battery pack 11, and a second protection circuit 19C is connected to the battery protection circuit 19B.

(Sub-Module 20)

Turning to FIG. 4, an example of sub-module 20 structure is shown. The sub-module 20 shown in this figure basically has the same structure as the main module 10. Here, elements that are the same as in the main module 10 have the same structure and operation, their identifying name is prefixed with "sub-" instead of "main," and their detailed description is abbreviated. As shown in FIG. 3, a basic module configuration 10a, which is the main module 10 without switching device 17, has almost the same structure as the sub-module 20. Accordingly, by using a common basic module configuration 10a, design, manufacture, construction, and maintenance of the system is simplified and cost reduction is possible.

The sub-module 20 of FIG. 4 is different than the main module 10 in that load outputs and sensor input are omitted. The sub-module 20 is provided with a sub-battery pack 21 connected in parallel with the main module 10 main battery pack 11 and having rechargeable batteries connected in series and/or parallel, a sub-solar cell panel 22 that is the sub-renewable energy power generating apparatus for charging the sub-battery pack 21, a sub-charging switch 25 connected between the output-side of the sub-solar cell panel 22 and the sub-battery pack 21 to control charging of the sub-battery pack 21, a sub-discharging switch 26 connected between the output-side of the sub-battery pack 21 and the switching device 17 to control sub-battery pack 21 discharge, and a sub-control circuit 23 that controls the sub-charging switch 25 and the sub-discharging switch 26 ON and OFF. In FIG. 3, the sub-module 20 without the sub-solar cell panel 22, sub-reverse current protection diode 24, and sub-discharging switch 26 is shown as a sub-module core 20b.

The sub-module 20 has a sub-reverse current protection diode 24 connected at the output-side of the sub-battery pack 21. The output-side of the sub-reverse current protection diode 24 is connected to the connection point CP in parallel with the main module 10 main reverse current protection diode 14 and the switching device 17. Consequently, power is supplied to the illumination source 3 through the sub-reverse current protection diode 24 and switching device 17 from the sub-battery pack 21 as well as from the main battery pack 11. By receiving power from the sub-module 20 as well as from the main module 10, the illumination source 3 can be powered for a longer time period. For example, if main module 10 power is inadequate and sufficient brightness cannot be attained, power can be received from the sub-module 20 to make up for the lack of power. Accordingly, by connecting spare sources of power in this manner, the stability and dependability of power delivered to the load can be improved.

With this connection scheme, battery outputs from each main module 10 and sub-module 20 are connected in parallel through reverse current protection diodes 14, 24. As a result, the system has the positive feature that even if main module 10 output voltage drops, system output voltage can be sustained by receiving supplementary power supplied from the sub-modules 20. Specifically, the main module 10 main control circuit 13 monitors the voltage at the connection point CP, and based on the monitored voltage, controls the switching device 17 ON and OFF to maintain essentially constant illumination source 3 brightness. Here, the voltage monitored at the connection point CP is the output voltage of all the parallel-connected modules.

When battery outputs from each module are equal, equal output is obtained from each battery pack. Since battery outputs from each main module 10 and sub-module 20 are connected in parallel through reverse current protection diodes 14, 24, the highest output voltage of all the modules connected to the connection point CP becomes the monitored voltage when battery outputs from each module are unequal. The module with the highest output voltage supplies the most current, and output current from the other modules is correspondingly lower or zero. This has the tendency to effectively equalize the output voltage from each module. When a plurality of modules is connected, this tendency allows approximately constant output voltage to be maintained from each module and is associated with the equalization of rechargeable battery characteristics in each module. Consequently, long periods of charging or discharging of one particular rechargeable battery can be avoided, and the system achieves a positive feature that contributes to increased rechargeable battery lifetime.

In this electric power system 100, the battery pack in each module is charged by the solar cell panel provided for that module. Further, the output of each module is used to supply power to the load. In other words, each module can only be charged by its connected solar cell panel. For example, a module cannot be charged by the battery pack or solar cell panel of another mutually connected module. To implement this arrangement, modules are mutually connected to the connection point CP with each module making that connection through a reverse current protection diode. As a result, even if current is inclined to flow from a high output voltage module into the output of a low output voltage module, it is prevented from doing so by the reverse current protection diode provided in each module. Consequently, current output from each module is only allowed to flow in a direction that drives the load. When a plurality of modules is connected to power a common load, reverse current flow can be effectively prevented, and charging of the rechargeable batteries in one module by the rechargeable batteries in another module is avoided.

The sub-module 20 configuration described above is just one example. For example, the main module of FIG. 3 can also be used as a sub-module. In the case where the main module is used as a sub-module, no connection is made to the load outputs or sensor input. In any case, a single main module administers control of the power supplied to a load such as an illumination source 3, and all other modules are used to supply power to the connection point CP.

In the example of FIG. 3, although one sub-module 20 is connected to the main module 10, it should be clear that two or more sub-modules can also be connected to the main module. In particular, since higher power can be supplied by increasing the number of connected sub-modules, reliability and power supply stability can be improved. However, since the required installation space and cost increases with the number of modules, the number connected modules is appropriately determined according to the application requirements (design specifications).

(Load Power Control)

As described previously, the main control circuit 13 monitors the voltage at the connection point CP and controls the switching device 17 ON and OFF according to the monitored voltage. Specifically, using PWM control of the duty cycle, the main control circuit 13 controls the time that the switching device 17 is ON and the time that it is OFF to achieve a constant illumination. When the monitored voltage drops, the duty cycle is increased to increase the time that current flows and make power consumption constant even when the voltage is lower. When the monitored voltage increases, the duty cycle is decreased to reduce the time that current flows and make power consumption constant even when the voltage is higher. As a result, a constant brightness is possible independent of highs and lows in the monitored voltage. With this type of pulse control of the illumination source 3 power, there is no need to convert the output voltage, and circuitry such as a DC/DC converter is unnecessary. Accordingly, system efficiency is increased, and DC/DC converter maintenance such as repair and replacement is eliminated contributing to a maintenance-free system.

(Operator Interface 40)

The main control circuit 13 is connected to an operator interface 40, and the user operates the operator interface 40 to input required settings. For example; the brightness of the illumination source 3 can be adjusted, or the lighting pattern can be changed. Input devices such a keyboard, mouse, touch-panel, and input console can be used as appropriate. In addition, a display panel can be provided to display parameters such as instantaneous power generation, daily accumulated power generation, and activated load power consumption.

Further, the main control circuit 13 can be provided with a communication output port for communication with external devices. Communication with external devices through the communication output port can be performed in accordance with existing communication protocol specifications. The example of FIG. 3 adopts communication via the system management bus (SMBus).

(Battery Pack)

A battery array having a plurality of battery cells connected in series and/or parallel is used as the battery pack. Circular cylindrical battery cells or battery cells having a rectangular external case can be used as the battery cells. Rechargeable batteries such as lithium ion rechargeable batteries, nickel hydride batteries, or nickel cadmium batteries can be favorably used. In particular, use of lithium ion rechargeable batteries is preferred. Since lithium ion rechargeable batteries have high energy density, they are suitable for making the battery pack compact and light-weight. Further, the allowable temperature range for lithium ion rechargeable battery charging and discharging is wide compared to lead-storage batteries and nickel hydride batteries. This allows efficient charging and discharging over the entire year of seasonal change.

Preferably, iron phosphate-group materials are used as the battery cell positive electrode material. As a result, safety can be improved and charging and discharging temperature dependency can be suppressed. In particular, these battery cell electrodes can maintain relatively high charging and discharging efficiency even at low temperatures to enable efficient charging and discharging even during winter.

Further, the lithium ion rechargeable battery positive electrode can be a three component electrode. Instead of the prior art lithium cobalt oxide positive electrode, this type of lithium ion rechargeable battery uses a positive electrode that is a mixture of lithium cobalt oxide and a lithium-nickel-manganese-cobalt (Li—Ni—Mn—Co) composite oxide. By using the three elements Ni, Mn, and Co in addition to Li, this lithium ion rechargeable battery has improved thermal stability when charged with a high voltage, and maximum charging voltage is increased to 4.3V allowing higher capacity.

However, during charging, it is preferable to set the battery cell voltage intentionally lower than the full-charge voltage. For example, although a lithium ion rechargeable battery used under normal conditions is judged to be fully-charged at a voltage near 4.2V, determination of full-charge can be set to 4V. As a result, extended lifetime is designed in the system.

It is also preferable to select a nominal specified battery pack (battery block) voltage (in the case of lithium ion rechargeable batteries, approximately 3.7V-4.0V times the number of series-connected cells) that is lower than the solar cell panel maximum output operating voltage (Vop). It is even more preferable to select a battery pack voltage that is 70%-90% of Vop. This is because solar cell panel operating voltage, Vop, is affected by battery pack voltage, and charging power is reduced for a voltage separated from Vop. In addition, this voltage selection makes solar cell panel voltage high compared to the battery pack deep-discharge voltage. Accordingly, during charging to full-charge, it is preferable for battery voltage to become close to Vop as the full-charge voltage is approached. Further, it is necessary to consider solar cell panel voltage variation with temperature in the selection of an appropriate battery pack voltage. Therefore, the voltage range cited above is even more appropriate.

By using the voltage range described above, a DC/DC converter is not required for battery cell charging in the present embodiment, and internal power loss incurred by DC/DC converter operation is avoided. This makes high efficiency charging possible, eliminates maintenance operations to replace the DC/DC converter, and allows the number of parts to be reduced. Accordingly, the failure rate is reduced, cost is reduced, and reliability is improved allowing the prospect of long-term maintenance free operation. In the present embodiment, elimination of the DC/DC converter for battery cell 41 charging is made possible by selecting the voltage range described above.

Further, the battery cell allowable temperature range for charging is set differently than the allowable temperature range for discharging. Specifically, the allowable temperature range for discharging is widened at the low temperature end. This allows efficient discharging at night time, which is often cooler than the day time when charging is performed.

As described above, a stand-alone electric power system can be realized that requires no connection to a commercial power source. In particular, power can be supplied even when commercial power becomes unavailable such as during a natural disaster. Consequently, this system is well suited for use as an emergency power system for applications such as emergency lighting or as an emergency power source apparatus. Furthermore, the system is preferable from the aspect that no fossil-fuels are consumed and it is a ecologically clean source of electric power.

(AC Adapter Module 30)

The electric power system of FIG. 3 is also provided with an AC adapter module 30 that supplies commercial power. Accordingly, the main module 10 is provided with an AC adapter input IA to connect with the AC adapter output OA of the AC adapter module 30. The AC adapter module 30 is provided with an AC adapter 31 that steps-down voltage from the commercial power source AC, and an AC reverse current protection diode 32 connected to the output of the AC adapter 31 to allow current flow from the AC adapter 31 to the output while preventing current flow from the output back to the AC adapter 31. The AC adapter output OA of the AC adapter module 30 is connected to the AC adapter input IA of the main module 10, and the AC adapter input IA is connected to the connection point CP.

With this configuration, even during periods of insufficient power such as during extended periods of rain, power can be temporarily obtained from a commercial power source to light the streetlight and improve reliability as a street lighting system. When the monitored voltage at the connection point CP can be maintained at or above a specified voltage, power from the commercial power source is not used to light the streetlight, and of course with this circuit structure, commercial power is not used to charge the rechargeable batteries. Therefore, this system can be configured to use renewable energy as much as possible and normally not depend on commercial power.

In the example described above, solar cell panels are used as the renewable energy power generating apparatus. Specifically, a main solar cell panel 12 is connected to the main module 10 as the main renewable energy power generating apparatus, and a sub-solar cell panel 21 is connected to the sub-module 20 as the sub-renewable energy power generating apparatus. However, the renewable energy power generating apparatus of the present invention are not limited to solar cell panels. For example, power generating apparatus such as wind turbines, tidal power generators, and geothermal power generators can also be used. In addition, power generating apparatus such as fuel cells and renewable energy gas generators can also be used. In the present application, the power generating apparatus is not limited to devices labeled "renewable energy power generating apparatus," and its meaning is intended to include innovations such as fuel cells.

(Illumination Source 3)

Light emitting diodes (LEDs) are well suited for use as the illumination source 3. LEDs have the positive features of low power consumption compared to illumination sources such as incandescent light bulbs and fluorescent lights, long lifetime, vibration resistance, and superior reliability. In addition, bulb burn-out is essentially a non-occurrence effectively making replacement unnecessary and allowing long-term maintenance-free operation. In addition to normal lighting or continuous lighting, LEDs can also be illuminated in a pulse operated or blinking mode. In particular, LEDs have superior endurance with respect to turn-on current, and are ideally suited for pulse illumination. For example, when the remaining capacity of the battery array becomes low, the illumination period can be extended by switching from normal lighting to pulse illumination. The frequency of the ON and OFF pulse illumination cycle is preferably set to a high frequency that is effectively not perceived by the human eye such as 10 Hz-50 Hz Employing this type of pulse illumination can further restrain power consumption. In particular, pulse illumination can be used to extend illumination time during the winter when daylight is limited or during continuously cloudy weather such as during a rainy season. When the energy stored in the battery cells is provided only by sunlight and that stored energy becomes insufficient due to conditions such as extended periods of rain with no sunlight, pulse illumination can make up for or avoid a complete lack of night-time illumination.

This electric power system can be conveniently used for night time illumination in locations such as uninhabited islands or rural areas where commercial power is unavailable or difficult to attain. In those kinds of conditions, maintenance-free operation is ideal, and the use of long lifetime battery cells and illumination devices is desirable. For example, by employing lithium ion rechargeable batteries as the battery cells, charging and discharging can be performed with high power using a small number of battery cells. Further, by restraining the current and voltage below specification limits during battery charging, the burden on the rechargeable batteries is alleviated allowing battery lifetime to be lengthened. In addition, if LEDs are used as the source of illumination, power consumption is low compared to incandescent light bulbs and fluorescent lights, long lifetime greater than 10,000 hrs of operating time is attained, and maintenance-free operation is possible for extremely appropriate application.

Besides a streetlight, the load can also be equipment such as a video camera or a battery charger. For the example in FIGS. 1 and 3, a wireless video camera 4 is connected to load output O2 and power from the electric power system is used to drive that load. The wireless video camera 4 can be used to monitor and record images of a given location. In this example, the illumination source 3 connected to load output O1 is powered according to PWM control as described previously, but load output O2 is driven continuously. Specifically, power is continuously supplied from load output O2, and if for example, an illumination source is connected to load output O2, that illumination source can be continuously illuminated.

In a bicycle parking structure provided with a battery charger to charge the battery pack BP of bicycles with electrical assist (electrical assist bicycles AB), the electric power system can also be used to supply power to the bicycle battery pack BP charger. In this electric power system, the battery pack charger becomes a load. Further, this battery charger load is not limited to a bicycle battery pack BP charger and other types of battery chargers can also be connected. For example, a battery charger for electric scooter battery packs can be connected instead of, or in addition to the battery charger for electrical assist bicycle battery packs BP. A scooter power supply with an electric scooter charging cable can also be provided to charge plug-in type electric scooters. Electric outlets such as a 100V AC outlet or a 200V AC outlet can also be provided. In this manner, various loads can be connected or added as required according to the application. The present invention is not limited by the name of its application and is not limited to a streetlight load. Accordingly, the present invention includes configurations that connect other loads selected as appropriate.

(Sensor Input IS)

The main module 10 can be provided with a sensor input IS. For example, a motion detecting sensor such as one employing a photoelectric sensor can be provided, and that sensor output can be connected to the main module 10 sensor input IS. By connection of the sensor input IS to the main control circuit 13, the illumination source can be activated or its brightness can be increased when the sensor detects a person's motion and transmits that information to the main control circuit 13. When transmission at the sensor input IS ceases, output to the illumination source can be turned OFF after a given time period. In addition, the sensor power supply is connected to the main module 10 sensor power output OUT to power the sensor. Since continuous sensor activation is required, the sensor power output OUT is not connected through the switching device 17 and power is continuously output.

(Second Embodiment)

Figure 5:
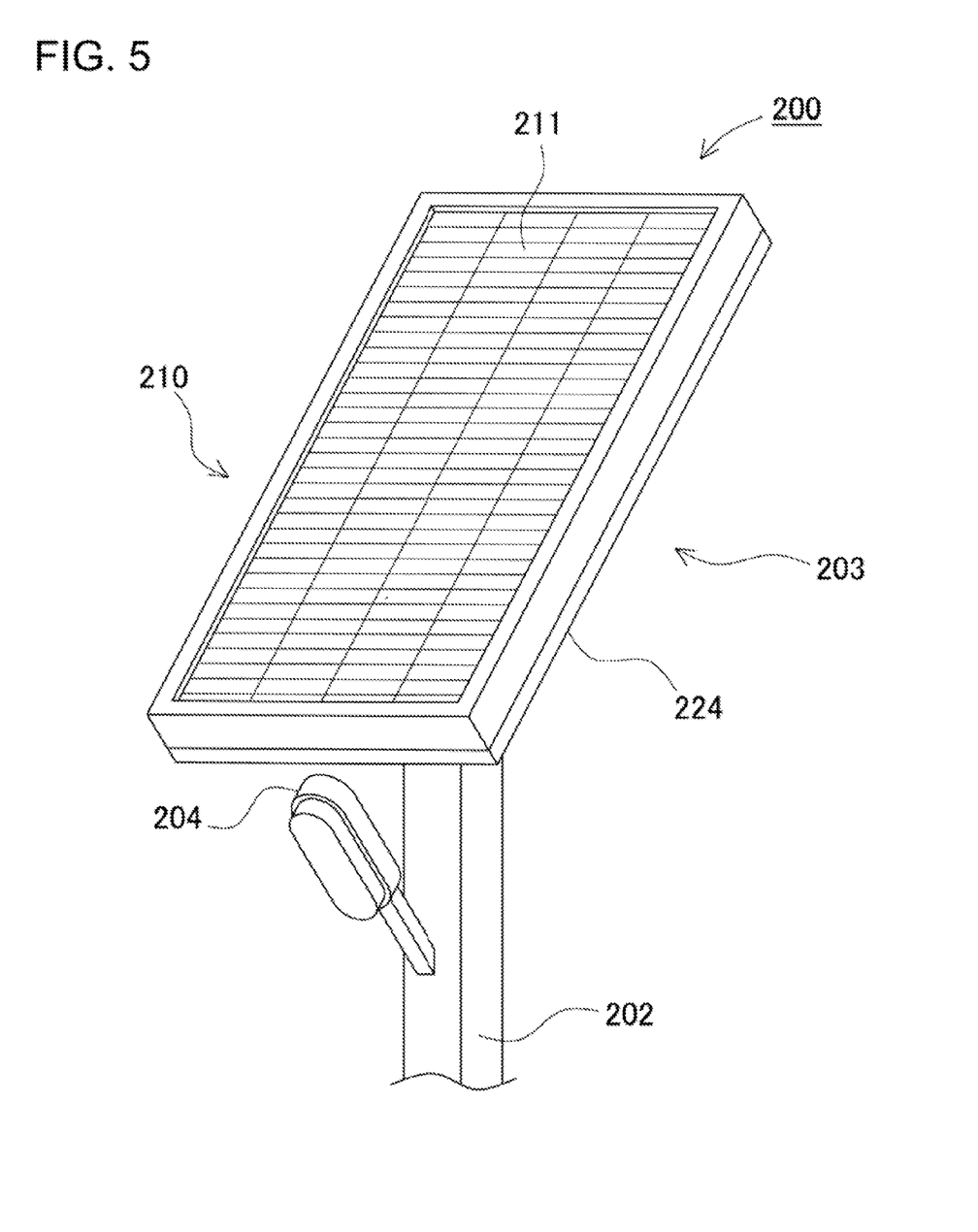
FIG. 5 is an oblique view as viewed from the front of the exterior of an electric power system for the second embodiment.
Figure 6:
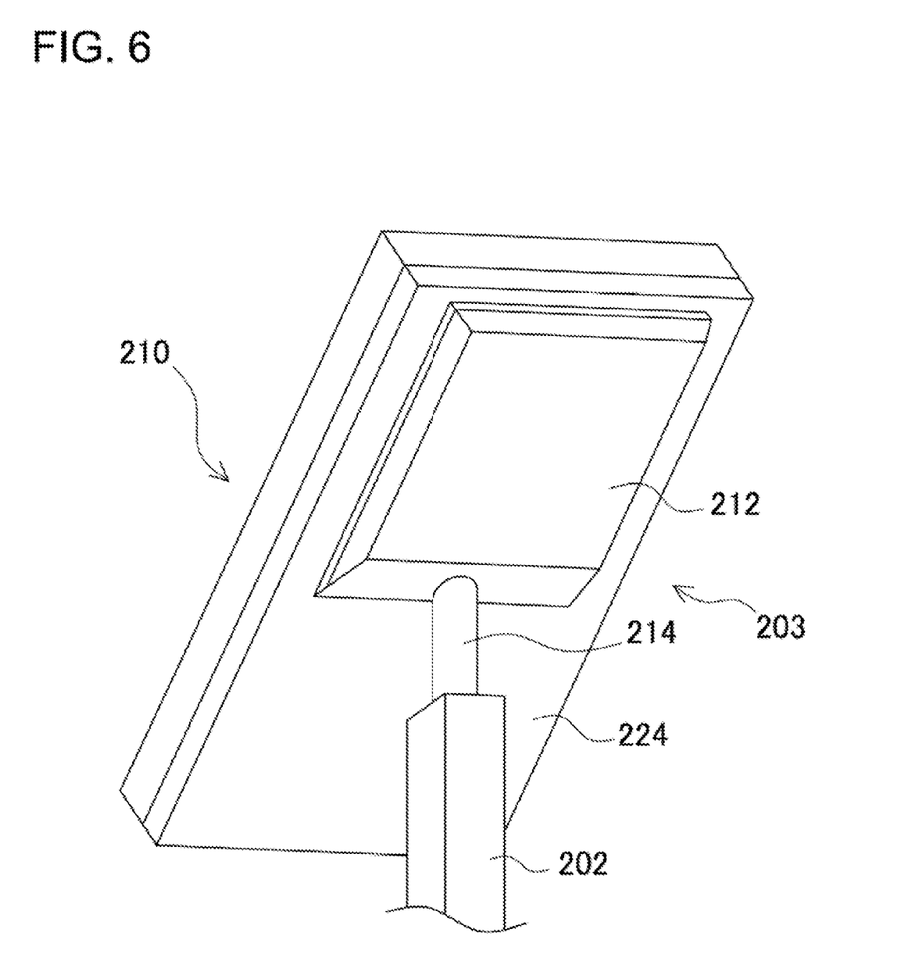
FIG. 6 is an oblique view as viewed from the back of the electric power system of FIG. 5.
Figure 7:
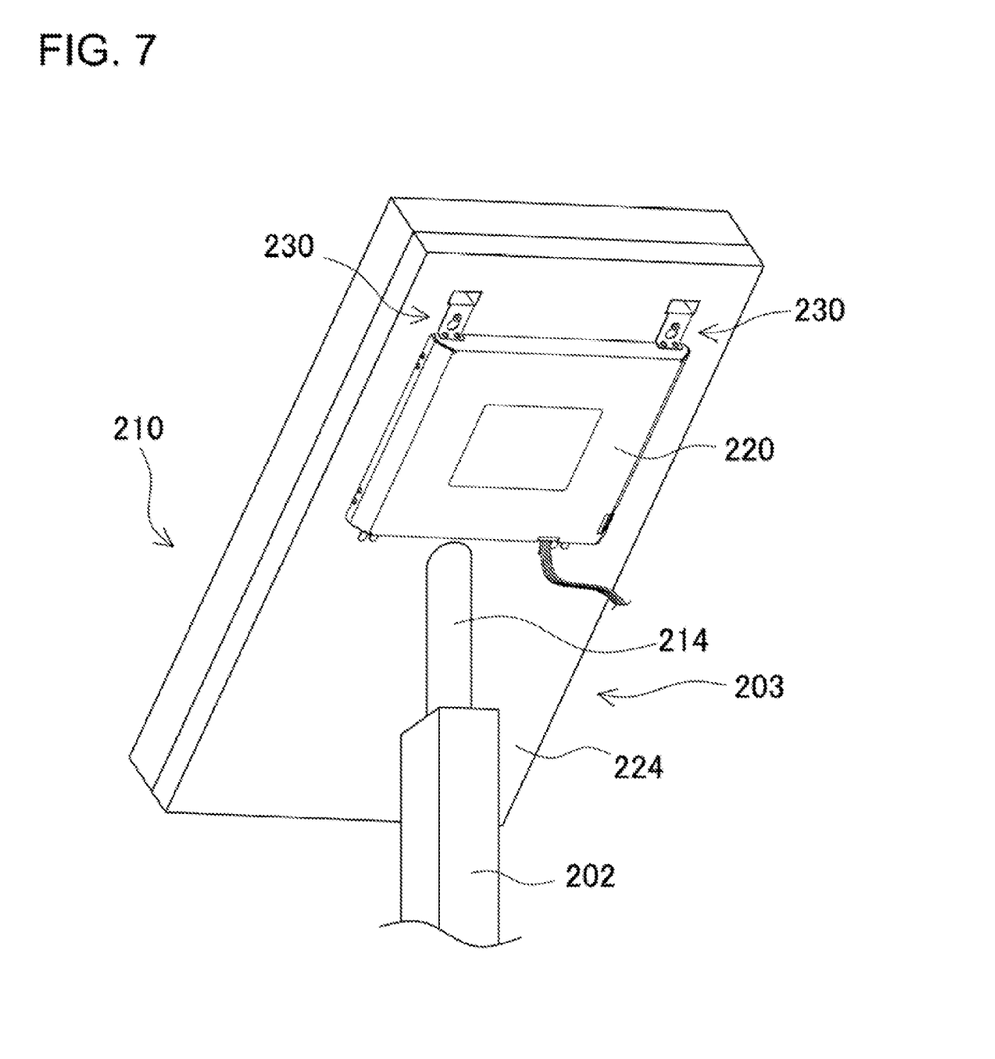
FIG. 7 is an oblique view showing the electric power system of FIG. 6 with the battery cover removed to expose the battery box.

The first embodiment described above uses solar cell panels in a bicycle parking structure that has the added function of battery pack charging. However, the load connected to the electric power system of the present invention is not limited to the load described in that example, and various electrical devices can be connected. For example, an electric power system with a streetlight connected as the load is adopted as the second embodiment described based on FIGS. 5-7. FIG. 5 is an oblique view as viewed from the front of the exterior of the electric power system, FIG. 6 is an oblique view as viewed from the back-side, and FIG. 7 is the oblique view of FIG. 6 with the battery cover removed to expose the battery box. The electric power system 200 shown in these figures is applied as a streetlight power source. Accordingly, the electric power system 200 is attached to the top of a pole 202. As shown in FIGS. 5 and 6, the streetlight is provided with a base 203 attached at an incline to the top of the rectangular pole 202, an electric power system 200 with a rectangular cross-section mounted on the base 203, and an illumination source 204 attached to the pole 202 below the electric power system 200. The electric power system 200 has a solar cell panel 210 exposed on the front-side of the rectangular metal plate base 203, and as shown in FIG. 7, has a battery box 220 housing a battery array mounted on the back-side. As shown in FIG. 6, the outside of the battery box 220 is enclosed in a battery cover 212 to give the battery cells two layers of protection from weather such as wind, rain, and snow. In the electric power system 200, sunlight shines on the solar cell panel 210 during the day generating electric power, the battery array is charged with the generated power, and at night LEDs, which are the illumination source 204, are activated with that power. As a result, the streetlight can be illuminated at night without the use of commercial power, and a power generating, self-contained streetlight is realized.

As in the first embodiment, the solar cell panel 210 is a planar array of a large plurality of solar cells and the exposed surface of that flat-panel array is the sunlight absorbing surface. The installation angle of the solar cell panel 210 is set by the angle it makes with the pole 202. The solar cell panel 210 is provided with a flat rectangular panel section 211, and a frame attached around the perimeter made from material such as aluminum alloy. The panel section 211 is configured with reinforced light-transparent glass on the sunlight absorbing front-side, a film is used on the back-side, and the solar cells are sandwiched in between with gaps inside filled with transparent resin. The base 203 is made up of an approximately rectangular flat metal (such as steel) plate 224 and a circular cylindrical connecting section 214 weld-attached to the center region of the base 203 plate 224. The size of the base 203 plate 224 is set to dimensions that can hold the solar cell panel 210. The upper end of the pole 202 is provided with a circular cylindrical connecting piece that inserts into the circular cylindrical connecting section 214, and that connecting piece is inserted into the connecting section and attached from the outside by a common knowledge attachment method such as screw-attachment. The base plate 224 is provided with an opening and the pole is attached at that opening. Wiring from the battery box 220 is run through a separate wiring hole in the base plate 224 from the back-side of the base plate 224 to the front-side, which is the solar cell panel 210 side. Subsequently, wiring is run inside the pole 202 through the pole 202 opening in the base plate 224. Output wires from the solar cell panel 210 connect to the battery box 220 through the wiring hole.

In general, the optimum angle for maximum year-round solar cell power generation is known for the latitude of the installation site. In the present embodiment, it is preferable to make the solar cell panel 210 installation angle (the obtuse angle between the panel and the pole) larger than the generally known optimum angle. When considering seasonal variation of the height of the sun (solar declination), a large installation angle is preferable in the winter, and a small installation angle is preferable in the summer. By making the installation angle for the present embodiment larger than the known standard angle, the amount of power generated in the winter is particularly increased. Although the amount of power generated in the summer is reduced by adopting this installation angle, the amount of summer-time daylight is sufficiently long and for the most part there is no problem providing the required brightness and illumination time at night. In contrast, by choosing an installation angle favoring the winter, the amount of heat derived from sunlight incident on the solar cell panel 210 during the winter is increased. Thermal energy absorbed from sunlight raises the temperature of the rechargeable battery cells to restrain charging capacity degradation caused by low battery cell temperature allowing winter-time power to be increased. Since this installation angle allows summer-time heat generation to be controlled, it has the outstanding effect that a sufficient amount of power can be generated during the winter and temperature rise can be restrained during the summer.

The battery box 220 is mounted at the back-side of the solar cell panel 210. As shown in FIG. 7, the battery box 210 has a thin box outline with a planar mounting surface on the side attached opposite the solar cell panel 210. The battery box 220 has beveled edges on its back-side to reduce wind resistance. The exterior of the battery box 220 is configured with an outer case made of metal with superior thermal conductivity. Attachment hardware 230 is provided at the four corners of the battery box 220, and the attachment hardware 230 allows the battery box 220 to be mounted approximately parallel to the solar cell panel 210. Accordingly, even after attachment of the battery box 220, the unit including the solar cell panel 210 retains a flat-panel shape and the entire electric power system 200 can have a thin outline. Further, the battery array housed in the battery box 220 is disposed separated from, and parallel to the solar cell panel 210. As a result, the battery cells can be uniformly heated by thermal energy from the sunlight, and in particular, winter-time charging efficiency can be improved. With a design that does not exceed maximum allowable battery array charging temperature in the summer and does not drop below minimum allowable charging temperature in the winter, efficient rechargeable battery utilization can be achieved.

INDUSTRIAL APPLICABILITY

The electric power system of the present invention can be appropriately used in applications such as a stand-alone illumination apparatus that does not require commercial power, or as a charging apparatus for electrical assist bicycle batteries.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2010-025,985 filed in Japan on Feb. 8, 2010, the content of which is incorporated herein by reference.

What is claimed is:

1. An electric power system comprising:
a main module; and
a sub-module,
the main module comprising:
a load;
a main renewable energy power generating apparatus that generates electric power from renewable energy;
a main battery pack connected to the main renewable energy power generating apparatus with a plurality of rechargeable batteries connected in series and/or parallel that are charged by power generated by the main renewable energy power generating apparatus;
a switching device connected between the main battery pack and the load to supply power from the main battery pack to the load;
a main control circuit that controls load illumination by controlling the switching device ON and OFF; and
a main reverse current protection diode connected in series with the switching device at the output-side of the main battery pack to allow main battery pack discharge to the load while preventing current flow from the load-side back to the main battery pack, the sub-module comprising:
a sub-battery pack connected in parallel with main battery pack of the main module with a plurality of rechargeable batteries connected in series and/or parallel;
a sub-renewable energy power generating apparatus that charges the sub-battery pack; and
a sub-reverse current protection diode connected in series with the switching device at the output-side of the sub-battery pack to allow sub-battery pack discharge to the load while preventing current flow from the load-side back to the sub-battery pack,
wherein the output-side of the sub-reverse current protection diode is connected to a connection point between the main module main reverse current protection diode and the switching device to allow power to be supplied to the load from the sub-battery pack through the sub-reverse current protection diode and the switching device, and
the main module main control circuit controls the switching device ON and OFF to supply power from both the main module main battery pack and the sub-module sub-battery pack.

2. The electric power system as recited in claim 1 wherein the main module further comprises:
a main charging switch connected between the output-side of the main renewable energy power generating apparatus and the main battery pack that controls charging of the main battery pack; and
a main discharging switch connected between the output-side of the main battery pack and the switching device that controls discharging of the main battery pack, and
wherein the sub-module further comprises:

a sub-charging switch connected between the output-side of the sub-renewable energy power generating apparatus and the sub-battery pack that controls charging of the sub-battery pack; and a sub-discharging switch connected between the output-side of the sub-battery pack and the switching device that controls discharging of the sub-battery pack.

3. The electric power system as recited in claim 1 further comprising an AC adapter module, the AC adapter module comprising:

an AC adapter that converts and supplies power from a commercial power source; and an AC adapter reverse current protection diode connected to the output-side of the AC adapter to allow current flow from the AC adapter to the output while preventing current flow from the output back to the AC adapter, wherein the AC adapter module AC adapter output is connected to the connection point.

4. The electric power system as recited in claim 1 wherein the main control circuit monitors the voltage at the connection point and controls the ON and OFF duty cycle (ratio of the ON time to the total ON and OFF period) of the switching device according to the monitored voltage; and the main control circuit supplies power to the load with a higher duty cycle when the monitored voltage is low than when it is high.

5. The electric power system as recited in claim 1 wherein power is supplied to the load from the main battery pack and the sub-battery pack without intervention of a DC/DC converter by controlling the ON and OFF duty cycle of the switching device.

6. The electric power system as recited in claim 1 wherein the renewable energy power generating apparatus is either solar cells, wind turbines, or tidal power generators.

7. The electric power system as recited in claim 1 wherein the rechargeable batteries are lithium ion batteries.

8. The electric power system as recited in claim 1 wherein the load is an illumination source.

9. The electric power system as recited in claim 8 wherein the illumination source is light emitting diodes.

* * * * *